United States Patent

[11] 3,605,018

[72] Inventor Gino John Coviello
Buffalo, N.Y.
[21] Appl. No. 759,655
[22] Filed Sept. 13, 1968
[45] Patented Sept. 14, 1971
[73] Assignee Sylvania Electric Products Inc.

[54] INTERFERENCE SUPPRESSION IN A RECEIVER BY ENVELOPE VARIATION MODULATION
12 Claims, 5 Drawing Figs.

[52] U.S. Cl. 325/65, 325/323, 325/473, 328/162
[51] Int. Cl. H04b 1/10
[50] Field of Search 325/65, 473, 474, 475, 476, 478, 479, 480, 323–369; 328/162–168

[56] References Cited

UNITED STATES PATENTS

| | | | |
|---|---|---|---|
| 3,387,222 | 6/1968 | Hellwarth et al. | 325/474 |
| 3,117,278 | 1/1964 | Johnson | 325/65 |
| 3,271,679 | 9/1966 | Fostoff | 325/65 |
| 3,271,689 | 9/1966 | Hodder | 328/167 |
| 3,339,144 | 8/1967 | Squires | 325/478 |
| 3,351,859 | 11/1967 | Groth et al. | 325/65 |
| 3,479,599 | 11/1969 | Molik | 325/473 |
| 3,471.788 | 10/1969 | Bickford et al. | 325/476 |

*Primary Examiner*—Robert L. Griffin
*Assistant Examiner*—P M Pecori
*Attorneys*—Norman J O'Malley, Elmer J. Nealon and Edward J. Coleman

ABSTRACT: A nonlinear signal-processing circuit, especially useful in the receiver of a quaternary-phased spread spectrum communication system, for suppressing interfering signals that are stronger than the desired signal and have relatively constant waveform envelopes. The circuit includes an envelope detector combined with an averager and difference amplifier for deriving from the composite received signal a control voltage which is a function of the instantaneous phase difference between the interfering and desired signals. This control voltage and the composite received signal are then multiplied to produce as an output the desired signal with the interfering signal substantially suppressed.

INVENTOR.
Gino J. Coviello
BY Edward J. Coleman
AGENT.

INVENTOR.
Gino J. Coviello
BY
[signature]
AGENT.

INTERFERENCE SUPPRESSION IN A RECEIVER BY ENVELOPE VARIATION MODULATION

BACKGROUND OF THE INVENTION

This invention relates to radio communication systems and, more particularly, to means for suppressing strong interfering signals if favor of a desired signal by use of nonlinear processing in the receiver, especially in combination with spread spectrum techniques.

An important consideration in the design of sophisticated radio communication systems is the provision of suitable means for overcoming the problem of strong inband interference at the receiver. Two basic approaches which have been employed to suppress the effects of such interference upon reception are nonlinear adaptive processing and spread spectrum techniques. Typical of the first approach are the "-feedforward across a limiter" and "dynamic trapping" techniques described by Elie J. Baghdady in "New Developments in FM reception and Their Application to the Realization of a System of 'Power Division' Multiplexing, " IRE Transactions on Communications Systems, Sept. 1959, pp. 147–161. Although providing significant strong signal suppression capabilities, both of these nonlinear techniques have certain limitations that restrict their usefulness. The "feedforward" technique loses its effectiveness as the instantaneous frequency difference between the desired and interfering signal becomes less than half the bandwidth of the desired signal, while the "dynamic trap" becomes ineffective at the rate of frequency change of the interfering signal causes its spectrum to cover a significant portion of the band of the desired signal.

The use of spread spectrum techniques represents a more sophisticated approach in that protection is achieved against a much broader class of interfering waveforms (see "A Discussion of Spread Spectrum Composite Codes" by D. J. Braverman, dated Dec. 1, 1963 and available from the Defense Documentation Center as AD No. 425,862). By this approach, the information-bearing signal is mixed with a psuedo noiselike waveform prior to transmission to thereby widen the spectrum of the transmitted signal energy. At the receiver, this wide-band signal is correlated with a replica of the noiselike waveform to collapse the signal into its original information bandwidth. In general, the net signal-to-interference ratio improvement provided by this technique is equivalent to the ratio between the transmitted and information bandwidths. As an example, an expansion of 1,000 to 1 in bandwidth (30 y db. would provide a signal-to-interference ratio (S/I) improvement after correlation which is approximately 30 db. higher than the incoming S/I ratio received at the antenna.

A significantly improved nonlinear processor, which is not constrained by the aforementioned limitations of prior art nonlinear techniques and which significantly enhances the interference protection provided by a spread spectrum system, is described by the applicant in U.S. Pat. No. 3,478,268, issued Nov. 11, 1969, and assigned to the assignee of the present application. This nonlinear processor is connected at the front end of a radio receiver, ahead of any correlation or detection circuits, and is operative upon reception of a composite signal consisting of a desired signal and a stronger interfering signal to substantially suppress the interfering signal in favor of the desired signal. To avoid cancellation of the desired signal when it is stronger than the interference signal, the receiver includes a decision circuit for bypassing the nonlinear processor in the presence of such input conditions.

Briefly, the nonlinear processing circuit according to the aforementioned patent comprises an envelope detector and averager for deriving from the received composite signal a control voltage which approximates the amplitude of the interfering signal, a gain-adjusting circuit for controlling the amplitude of the composite received signal in response to this control voltage so as to generate a waveform which closely approximates the interfering signal waveform, and a difference amplifier for subtracting this approximation of the interfering waveform from the composite received signal. The resulting output of the difference amplifier consists of the desired signal with the interfering signal substantially suppressed. In a spread spectrum receiver, this output is coupled to the input of the correlator.

In a preferred embodiment, the gain-adjusting circuit comprises a limiter and band-pass filter, through which the composite received signal is processed to remove amplitude variations while retaining phase information, and a variable gain amplifier having a signal input to which this amplitude limited signal is applied, a gain control input which is coupled to the output of the averager and an output terminal which is connected to an input of the difference amplifier. In an alternate embodiment of the gain-adjusting circuit, the composite received signal is applied directly to the signal input of the variable gain amplifier, and the gain control signal for the amplifier is obtained from a divider to which the outputs of both the envelope detector and averager are applied.

When used is a quaternary-phased spread spectrum communication system, the nonlinear processor is capable of providing as much as an additional 40 db. of interference suppression in a spread spectrum correlation receiver, without requiring further expansion of bandwidth. Optimal operation is achieved in the presence of interfering waveforms which have envelopes that are constant or slowly varying with time, which include all varieties of frequency and phase-modulated waveforms. In contrast with the prior art, this technique remains effective when the interference spectrum coincides with the desired signal carrier.

SUMMARY OF THE INVENTION

The present invention provides a nonlinear processing circuit which accomplishes the same results as the aforementioned patent, but which operates in a different manner so as to provide significant advantages in the area of circuit simplification and reduced criticalness of design.

Briefly, the nonlinear processing circuit according to the invention employs a controlled gating of the composite incoming signal to produce the desired interference suppression. This gating action is essentially a modulation of the incoming signal with a function derived from its own envelope variations. More specifically, the gate control signal is derived by processing the fluctuations which normally appear in the envelope of the composite signal so as to obtain a representation of the instantaneous projection of the desired signal vector on the interfering signal vector. The resulting control voltage is a function of the instantaneous phase difference between the interfering and desired signals. In response to this control voltage, the gating action allows that portion of the interfering signal which is in phase with the desired signal to pass directly to the output; out-of-phase components are reversed in sign; and, quadrature components are suppressed completely. The resulting gated waveform, therefore, is basically in phase with the desired signal.

In a preferred embodiment of the invention, the circuitry for deriving the control voltage comprises an envelope detector, average and difference amplifier. The composite received signal is applied to the input of the envelope detector, and the detector output is applied directly to one input of the difference amplifier and through the averager to the other amplifier input. The resulting output voltage from the difference amplifier if the desired control signal. A multiplier provides the gating action by multiplying the control signal and composite received signal to produce an output consisting of the desired signal with the interfering signal substantially suppressed. In a spread spectrum receiver, this output is coupled to the input of the correlator.

In an alternative embodiment of the circuit for deriving a control signal, a high pass filter is used for processing the envelope detector output, in lieu of an averager and difference amplifier. Another alternative approach permits simplification of the mixer design by quantizing the control signal input, e.g.

by connecting a limiter between the difference amplifier output and the appropriate mixer input.

BRIEF DESCRIPTION OF THE DRAWINGS

This invention will be more fully described hereinafter in conjunction with the accompanying drawings, in which.

DETAILED DESCRIPTION OF THE INVENTION

Figure 1:
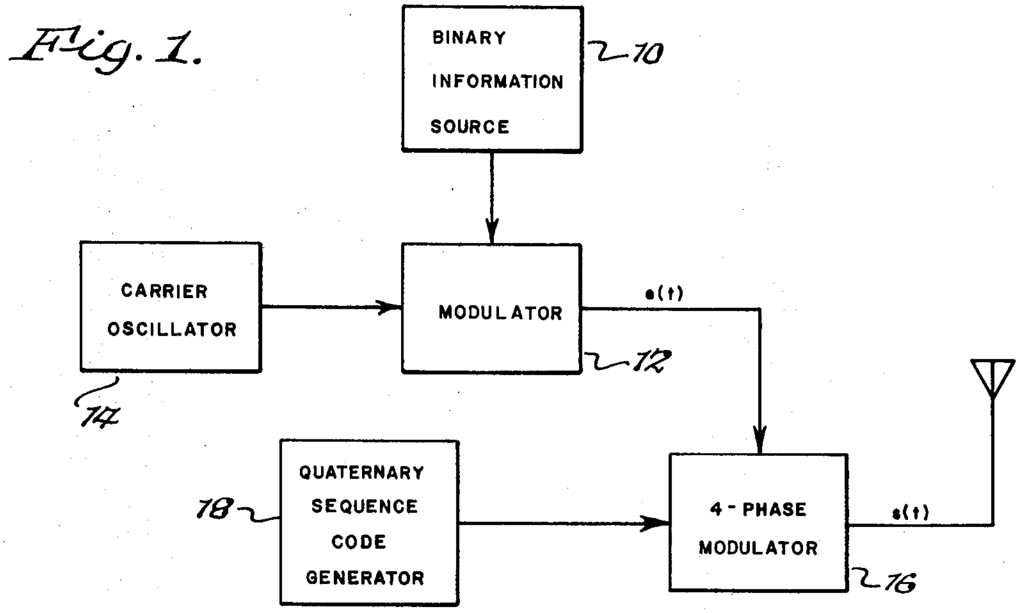
FIG. 1 is a block diagram of a transmitter including modulation means for producing a quaternary-phased spread spectrum signal.
Figure 2:
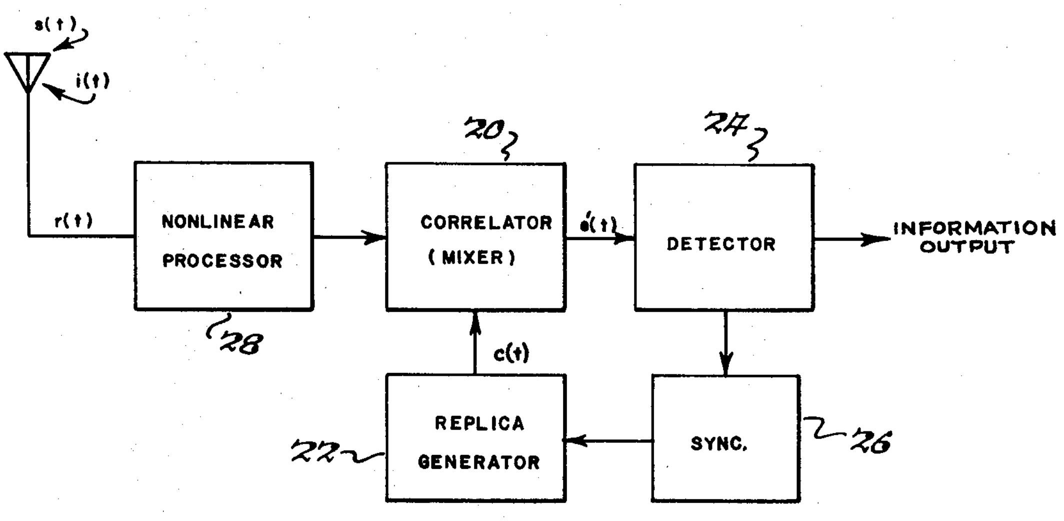
FIG. 2 is a block diagram of a correlation receiver associated with the transmitter of FIG. 1 ans including a nonlinear processor in accordance with the invention.

A preferred application of the interference suppression techniques of the invention is illustrated if FIGS. 1 and 2, which are simplified block diagrams of the transmitter and receiver, respectively, of a quaternary-phased 71 spread spectrum communication system. In the transmitter (FIG. 1) binary information from a source 10 is applied to a modulator 12 to phase modulate a carrier frequency applied thereto from oscillator 14. The resulting output is:

$$e(generator\ )=cos\ (\omega_s t +\Phi) \qquad (1)$$

where $\Phi$ is either 0 or $\pi$, corresponding to the binary states "-zero" or "one." It will be assumed that the information is supplied at $1/T$ bits per second, where $T$ equals the duration of one information bit. The waveform $e(t)$ represents the information-bearing signal and is applied to a 4-phase modulator 16 to be further modulated by the output of a quaternary sequence code generator 18 to produce the desired quaternary-phased spread spectrum signal for transmission, which appears at the receiver as:

$$s(t)=\sqrt{2S}\cos\,[\omega_s t+\Phi(t)] \qquad (2)$$

where $s$ is the received signal power and $\Phi(t)=\phi+b\frac{\pi}{2}$. The value of $b$ can have one of four possible values, 0, 1, 2, or 3, determined by the code generator 18 is a pseudo-random manner. Methods of generating such codes are well known in the art; e.g. see the Braverman report, supra, relative to binary sequences, and for the general case of quaternary maximum length sequences, see the text by W. W. Peterson entitled "Error Correcting Codes," MIT Press and John Wiley and Sons Inc., pp. 147–148. The method of implementing the four-phase modulator may be chosen from several known techniques, e.g. modulator 16 may comprise a delay line circuit having four output taps selectively controlled by the four output states of code generator 18 to produce phase delays of 0, $\pi/2$, $\pi$, or $3\pi/2$. The rate at which the phase states (values of $b$) are supplied is defined as $W$ per second. The bandwidth of the transmitted signal $s(t)$, therefore, is proportional to $W$, and it can be shown that the ratio of the transmitted bandwidth to the information bandwidth is given by:

$$\text{Band-spread ratio} =W/(1/T)=TW \qquad (3)$$

Referring now to FIG. 2, the correlation receiver associated with the spread spectrum transmitter of FIG. 1 is shown as comprising: a correlation mixer 20, also referred to as a correlator; a replica generator 22 which is identical to code generator 18 and provides one input to the correlation mixer; a detector 24 for integrating the output to the correlation mixer to provide the information output signal; and, a synchronizer 26 coupled between detector 24 and generator 22 for aligning the replica generator code stream with the received coded signal. If the received spread spectrum signal $s(t)$ were applied directly to the input of the correlator, the above-described transmitter and receiver would comprise a conventional spread spectrum communication system similar to that described in some detail in the Braverman report, supra. In the improved system, however, a nonlinear processor 28 in accordance with the invention is connected ahead of the correlator 20, as shown, to provide a significant improvement in interference suppression.

Before covering the detailed construction and operation of the nonlinear processor, the operation of the correlation receiver will be briefly described, assuming $s(t)$ is applied directly to correlator 20. Replica generator 22 produces a quaternary-phased waveform which may be expressed as:

$$c(t)=\cos\left(\omega_c t+b\frac{\pi}{2}\right) \qquad (4)$$

Mixing $s(t)$ and $c(t)$ and filtering out the high-frequency component results in:

$$e'(t)=\frac{\sqrt{2S}}{2}\cos\,[(\omega_s-\omega_c)t+\phi] \qquad (5)$$

Thus, it is seen that the wide-band signal $s(t)$ is compressed into the original information bandwidth, $1/T$.

Although the correlator functions to recover the narrow band information from the spread spectrum signal, just the opposite effect is achieved against a received interfering signal waveform. Since such a waveform is not correlated with the local code stream produced by generator 22, a band-spreading effect takes place. Even with continuous wave interference, the action of mixing with $e(t)$ spreads the interference energy over an effective bandwidth W. Thus, if the bandwidth of detector 24 is $1/T$, almost all of the desired signal energy will be utilized, but only $1/1W$ of the interfering signal energy will be accepted. As a first order approximation it may be stated that:

$$(S/I)_d(S/I)_a+TW \qquad (6)$$

where $(S/I)_d=$ the signal-to-interference ratio at the detector, and $(S/I)_a=$ the signal-to-interference ratio at the antenna. This shows that, ideally, an improvement in $S/I$ is achievable in direct proportion to the band-spread ratio, $TW$.

The interference suppression thus afforded by the spread spectrum technique is achieved against virtually all possible interference waveforms, both narrow and wide-band. By inserting the nonlinear processor 28 prior to the spread spectrum correlator, however, a substantial increase in the interference suppression capability of the system is provided against a specific class of interfering signal waveforms, namely, all those which have relatively constant or slowly varying envelopes. In general, this includes such common forms as: continuous wave, frequency modulated, frequency shift keyed, and phase shift keyed. Such a class of interfering waveforms can be represented by:

$$i(t)=\sqrt{2I}\cos\,[\omega_i t+\alpha(t)] \qquad (7)$$

Where $I$ is the interference power and $\alpha(t)$ is an arbitrary phase term (i.e. it can be constant, swept, random variable, etc.) and $\omega_i$ can be equal to or different than $\omega_s$. Further, as will be made clear, the subject nonlinear processor is operative to suppress the stronger of the constituent input signals; hence, it is useful only when the received interfering signal is stronger than the desired signal.

Figure 3:
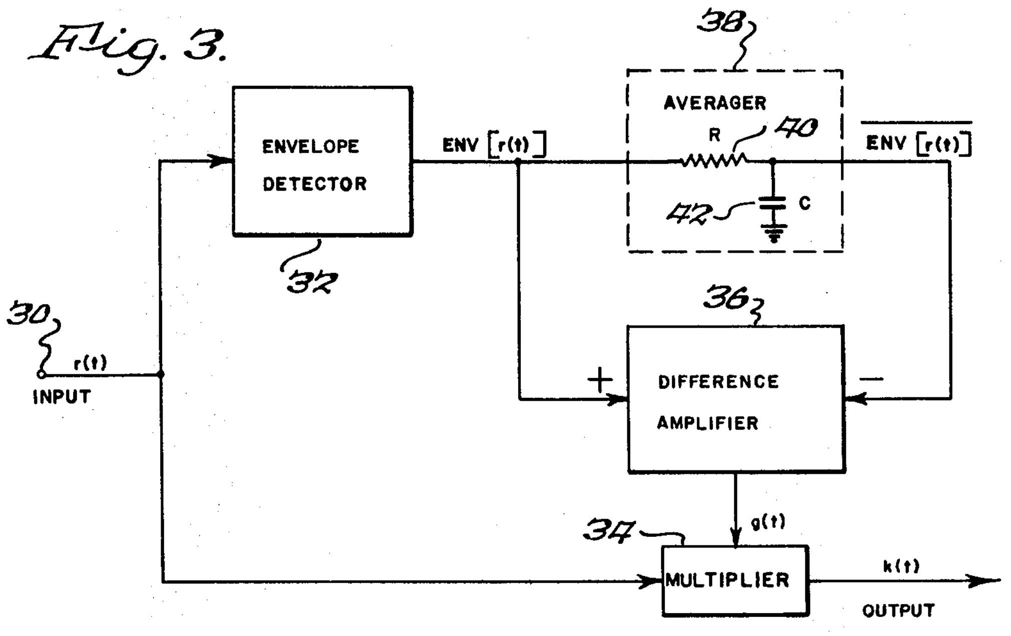
FIG. 3 is a block diagram of a nonlinear processor in accordance with the invention.

A preferred embodiment of nonlinear processor 28, according to the invention, is shown in FIG. 3. The common input, denoted as terminal 30, is connected to an envelope detector 32 and one input of a multiplier 34. The envelope detector output is connected directly to one input of a difference amplifier 36 and through an averager 38 to the other difference amplifier input. The output of difference amplifier 36 is then applied as a control voltage to the second input of multiplier 34. As will be described hereinafter, the resulting multiplier 34 output, upon multiplying this control voltage and the composite received signal, comprises the desired signal $s(t)$ with the interfering signal $i(t)$ substantially suppressed. This mixer output is the output of the nonlinear processor 28 which is coupled to correlator 20 in the receiver of FIG. 2 for a further improvement in $S/I$ of approximately $TW(db)$, as discussed above.

Using equations (2) and (7), the composite received signal applied to the nonlinear processor input terminal 30 may be expressed as:

$$r(t)=s(t)+i(5)$$
$$=\sqrt{2S}\cos[\omega_s t+\Phi(t)]+\sqrt{2I}\cos[\omega_i t+\alpha(t)] \quad (8)$$

it is assumed that:

both $\sqrt{2S}$ and $\sqrt{2I}$, the amplitudes of the desired and interfering signals, respectively, are constant or slowly varying with time; $I>>S$. This received signal is applied in parallel to envelope detector 32 and multiplier 34.

The function of envelope detector 32 is to remove the composite radio frequency carrier and to generate a direct current voltage which is proportional to the envelope of $r(t)$. This envelope detector output voltage, denoted Env $[r(t)]$, consists of constant and fluctuating components and may be expressed as:

$$Env[r(t)]=\{2S+2I+4\sqrt{SI}\cos[(\omega_s-\omega_i)t+\Phi(t)-\alpha(t)]\}^{1/2} \quad (9)$$

The constant component primarily represents the value which is derived from the terms $2S+2I$. The fluctuating is an oscillating one due to the cosine term and can never remain stationary since:

a. The terms, $(\omega_s-\omega_i)t+\Phi(t)-\alpha(t)$, represent the instantaneous phase difference between the signal's carrier and the interfering signal waveform. This phase would normally be expected to change continually at a rate proportional to the instantaneous frequency difference.

b. Even if the above frequency difference is zero, or very small, the action of the spread spectrum modulation will still cause discrete phase jumps, in increments of 90°, at the quaternary sequence code rate $W$.

As a consequence, the envelope of $r(t)$ will vary with time, having the following amplitudes under the specified conditions:

$env\ r(t)=\sqrt{2I}+\sqrt{2S}$ when $i(t)$. and $s(t)$ are in phase $=\sqrt{2I}-\sqrt{2S}$ when $i(t)$ and $s(t)$ are out of phase $\approx\sqrt{2I}$ when $i(t)$ and $s(t)$ are in phase quadrature Now, if the phase of $s(t)$ is rapidly varying, it is assured that the phase relationship between $s(t)$ and $i(t)$ will be rapidly varying; hence, Env $[r(t)]$ will also vary rapidly between the values $\sqrt{2I}\pm\sqrt{2S}$.

Averager 38, which follows the envelope detector, consists of a long time constant RC filter comprising a series resistive component 40, having a vale R, and a parallel capacitive component 42, having a value C. This filter functions to generate an output voltage which represents the average value of Env $[r(t)]$. The effective time constant of the averaging circuit, $T_{RC}$, should extend over a large enough number of quaternary sequence code periods $(1/W)$ to generate an effective average. A reasonable number would appear to be in the range of 10 to 50 code periods. This would normally be a very small percentage of an information bit duration.

The output of the averager circuit may be ideally represented by:

$$\overline{Env[r(t)]}=\int_0^t h(t,\tau)envR(\tau)d(\tau) \quad (10)$$

where $h(t,\tau)$ represents the impulse response of the averager circuit.

The fluctuating components of Env $[r(t)]$ (see equation (9) and discussion thereof) tends to be self-cancelling, so that to a first approximation:

$$\overline{Env[r(t)]}\approx\sqrt{2S+2I} \quad (11)$$

As the ratio $\sqrt{2S}/\sqrt{2I}$ comes small, the average becomes an excellent estimation of the interfering signal amplitude $\sqrt{2I}$ Hence:

$$\overline{Env\ [r(t)]}\approx\sqrt{2I} \text{ for } I\gg S \quad (12)$$

Under these conditions the output voltage from difference amplifier 36 may be expressed as:

$$g(t)=Env\ [r(t)]-\overline{Env\ [r(t)]}\approx Env\ [r(t)]-\sqrt{2I} \quad (13)$$

Let the instantaneous phase difference between the desired signal the interfering signal be represented as $\theta(t)$, that is:

$$\theta(t)=[\omega_s t+\Phi(t)]-[\omega_i t+\alpha(t)]=(\omega_s-\omega_i)t+\Phi(t)-\alpha(t) \quad (14)$$

Then, using equations (9) and (14), equation (13) can be rewritten as:

$$g(t)\approx\sqrt{2S+2I+4\sqrt{SI}\cos\theta(t)}-\sqrt{2I} \quad (15)$$

Continuing with the assumption that $I>>S$, equation (15) reduces to:

$$g(t)\approx\sqrt{2S}\cos\theta(t) \quad (16)$$

using the well-known approximation that $$\sqrt{1+2\epsilon}\approx1=\epsilon \text{ for } \epsilon\ll1,$$

in this case $\epsilon$ being $\sqrt{\frac{2S}{2I}}\cos\theta(t)$ Hence, $g(t)$ has a peak amplitude which is proportional to the signal power but modified by the cosine of the phase difference between the signals. In other words, $g(t)$ represents the instantaneous projection of the desired signal vector on the interfering vector.

By multiplying $g(t)$ and $r(t)$ in multiplier 34, the following output is obtained:

$$k(t)=g(t)\cdot r(t)\approx\sqrt{2S}\cos\theta(t)\{\sqrt{2S}\cos[\omega_s t+\Phi(t)]+\sqrt{2I}\cos[\omega_i t+\alpha(t)]\} \quad (17)$$

Making use of trigonometric identities and the definition of $\theta(t)$ given in equation (14), we obtain:

$$k(t)\approx\sqrt{SI}\cos[\omega_s t+\Phi(t)]+S\cos[\omega_i t+\alpha(t)]+S\cos\{2[\omega_s t+\Phi(t)]-[\omega_i t+\alpha(t)]\}+\sqrt{SI}\cos\{2[\omega_i t+\alpha(t)]-[\omega_s t+\Phi(t)]\} \quad (18)$$

It is clear from this expression that the first two terms represent the desired and interfering signals respectively, except that their respective amplitudes essentially have been reversed. The last two terms represent third-order intermodulation products. The fourth term is the significant intermodulation product as it is an undesired signal which is approximately 45° out of phase with the desired signal (the first term) and has the same amplitude, $\sqrt{SI}$. Consequently, the first term desired signal and fourth term undesired signal are of equal strength. The second and third terms are of negligible effect since they each have amplitude $S$, which is much less than $\sqrt{SI}$ when $S<<I$. It is clear, therefore, that the ratio of desired signal to all other signals at the nonlinear processor output is near 0 db., even though the interference at the antenna is much higher. The signal $k(t)$ can now be correlated with the spread spectrum reference to obtain the full processing gain.

The above-described signal processing may be considered from a more functional aspect by noting that $g(t)$ is actually a function of the instantaneous phase difference between the interfering and desired signals which is derived from the envelope variations of $r(t)$ and applied as a control voltage to modulate the composite signal $r(t)$ in the manner of a gating action, by means of multiplier 34. The control voltage $g(t)$ is positive when $i(t)$ tends to be in phase with $s(t)$; it is negative when $i(t)$ tends to be out of phase with $s(t)$; and, the magnitude of $g(t)$ indicates the relative degree by which $i(t)$ and $s(t)$ are in or out of phase. As $i(t)$ and $s(t)$ approach a quadrature condition, $g(t)$ approaches zero.

Since multiplier 34 multiplies $r(t)$ by the control voltage $g(t)$, it is clear that $r(t)$ changes only in magnitude when $g(t)$ is positive, but that it changes sign also when $g(t)$ is negative. The latter effect is equivalent to changing the phase by 180°. When $g(t)$ is near zero, $r(t)$ is suppressed in the mixer. Hence, $g(t)$ controls a gating action which has the effect of producing a waveform $k(t)$ which is basically in phase with the desired signal $s(t)$.

In order to simplify further discussion, the following definitions are made:

$$\beta_s(t)=\omega_s t+\Phi(t)$$
$$\beta_i(t)=\omega_i t+\alpha(t) \qquad (19)$$

If $S<<I$, then using these definitions and trigonometric identities, equation (18) becomes:

$$k(t)\approx\sqrt{SI}\{\cos\beta_s(t)+\cos[2\beta_i(t)-\beta_s(t)]\}$$
$$\approx 2\sqrt{SI}\cos[\beta_i(t)-\beta_s(t)]\cos\beta_i(t) \qquad (20)$$

This equation points up an interesting facet of the nonlinear processor. Whenever $\beta_s(t)$ and $\beta_i(t)$ are in quadrature, cos $[\beta_i(t)-B_s(t)]$ goes to zero and the signal disappears, as noted in other terms in the preceding discussion. Due to the quaternary phase modulation of the desired signal and the fact that $\beta_i(t)$ is not correlated with $\beta_s(t)$, however, the presence of an output signal is assured for approximately half of the quaternary sequence code periods during an information bit. Thus, there exists only a 3 db. net loss of signal power, while $S/I$ is greatly enchanced.

The effectiveness of the nonlinear processor can be quantitatively determined by use of a modified version of equation (6), namely:

Interference Suppression of Nonlinear Processor $=(S/I)_d-TW-(S/I)_n$ (21).

The interference suppression provided by the nonlinear processor will be nearly equivalent to the input $S/I$ ratio, increased suppression being provided as the interference becomes stronger. Hence, the processor tends to equalize the interfering and desired signal powers to provide an input to the correlator which is in the vicinity of 0 db. The correlator then provides a further improvement in $S/I$ which to a first approximation is equivalent to the $TW$ product. Thus, with $TW$=30 db., for example, a spread spectrum receiver without the processor would provide an $S/I$ at the detector of approximately −10 db. for an input $S/I$ ratio of −40 db.; with the nonlinear processor connected ahead of the correlator, however, the interference suppression would be improved by an added 40 db. to provide an $S/I$ ratio at the detector of approximately +30 db.

It is apparent, however, that since the nonlinear processor tends to cancel out the strong signal, its effect would be detrimental whenever the interfering signal is actually weaker than the desired signal. Consequently, a decision and control circuit is required in the receiver to switch the processor either in or out of the circuit as needed. One approach toward providing bypass control is to "measure" the input $S/I$ ratio (at the antenna) and trigger a switch at the correlator input when a preselected decibel level is crossed. A second approach is to employ a second correlation channel identical to the first, but without a nonlinear processor, and to compare the outputs of the channels to determine which has the greatest proportion of signal energy. This signal comparison can then be used to trigger a switch to select that channel as the information output. Suggested implementations of these two approaches, along with details of operation, are described in the aforementioned patent.

Figure 4:
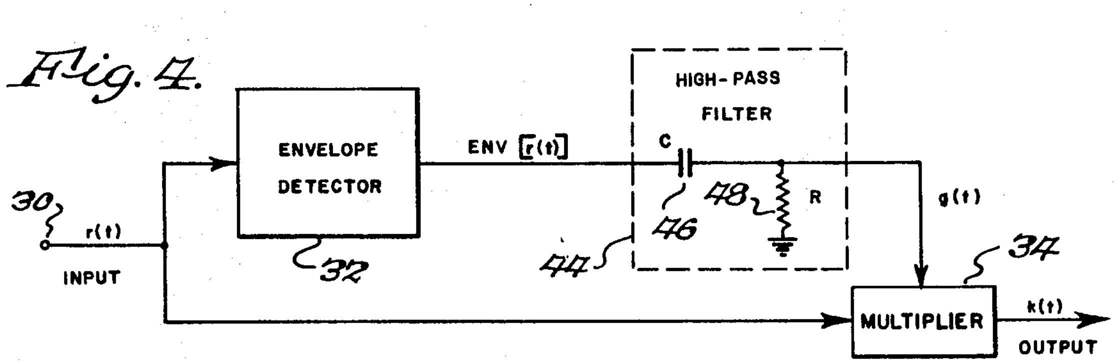
FIG. 4 is a block diagram of an alternative embodiment of a nonlinear processor in accordance with the invention.

An alternative circuit arrangement for deriving the control signal $g(t)$ from the output of envelope detector 32 is shown in FIG. 4. In lieu of averager 38 and difference amplifier 36, a high-pass filter 44 is used for processing the output signal Env $[r(t)]$ produced by envelope detector 32. The use of filter 44, which comprises a series capacitive component 46, having a value C, and a parallel resistive component 48, having a value R, yields further circuit simplification, yet it performs the same function in producing $g(t)$, as shall now be demonstrated.

High-pass filter 44 has a transfer function which, referring to any standard tables of Laplace transforms, is given as:

$$L\{g(t)\}=\left(\frac{sRC}{1+sRC}\right)L\{Env[r(t)]\} \qquad (22)$$

It will now be shown that filter 44 is equivalent to the averager and difference amplifier circuit combination of FIG. 3 by deriving the corresponding transfer function for the FIG. 3 arrangement. The averager 38 would normally be implemented by an RC low-pass filter, as illustrated in FIG. 3. The Laplace transform of this low-pass filter 40, 42, also obtainable from standard tables, is given as:

$$L\{\overline{Env[r(t)]}\}=\left(\frac{1}{1+sRC}\right)L\{Env[r(t)]\} \qquad (23)$$

Using equation (13), it can be shown that:

$$L\{g(t)\}=L\{Env[r(t)]\}-L\{\overline{Env[r(t)]}\}$$
$$=\left(1-\frac{1}{1+sRC}\right)L\{Env[r(t)]\}$$
$$=\left(\frac{sRC}{1+sRC}\right)L\{Env[r(t)]\} \qquad (24)$$

This transfer function is identical to that for the high-pass filter; hence, the two circuits are identical in that they derive the same $g(t)$.

Figure 5:
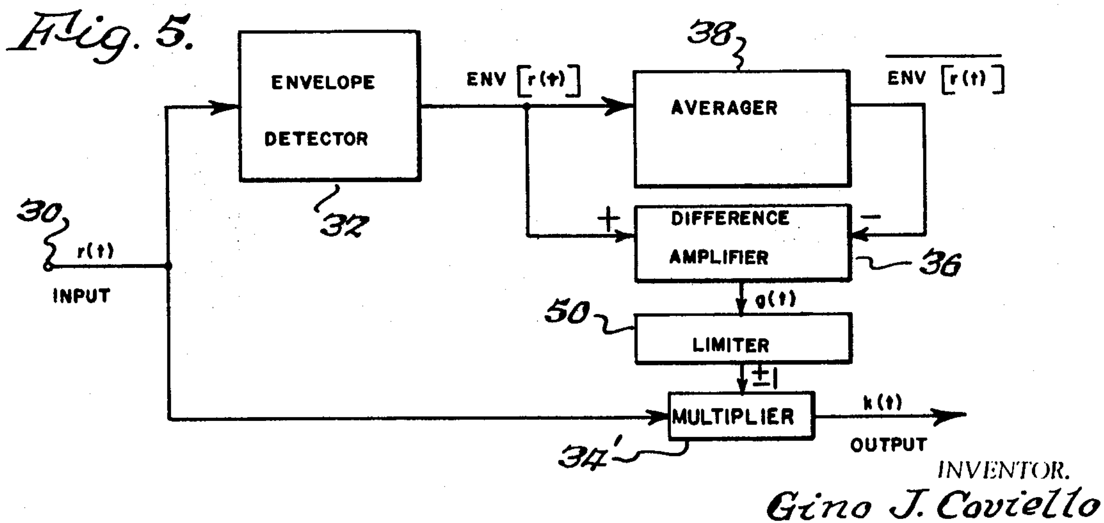
FIG. 5 is a block diagram of another alternative embodiment of a nonlinear processor in accordance with the invention.

Another alternative embodiment of the invention is illustrated by FIG. 5 wherein a limiter 50 is connected between the output of difference amplifier 36 and one input of a simplified multiplier 34' for quantizing the control voltage $g(t)$ into a binary (±1) signal. This approach enables the mixer design to be simplified at the cost of a small loss in performance.

Although the invention has been described in its preferred embodiment as comprising the use of a nonlinear processor in combination with a quaternary-phased spread spectrum signal to achieve interference suppression, the described nonlinear processor may also be effectively employed in a binary-phased spread spectrum system or a conventional radio receiver. If the spread spectrum modulation were binary instead of quaternary, the loss in signal power, due to nonlinear processing, would still be only 3 db. over a long averaging time. However, there could be periods of time extending over several information bits in which the interfering signal and the desired signal remain in quadrature. As previously noted, complete signal loss would occur during these bits. Quaternary spread spectrum modulation, on the other hand, prevents the loss of complete bits, as discussed above following equation (20).

In the case of a conventional radio receiver, without spread spectrum modulation the $b$ referred to with respect to equation (2) equals zero. Hence, if $\omega_s=\omega_i$ and $\alpha(t)$ is a constant, equation (20) reduces to:

$$k(t)\approx 2\sqrt{SI}\cos(\alpha(t)-\phi)\cos\beta_i(t) \qquad (25)$$

Here again there could be periods extending over several information bits in which $\Phi$ and $\alpha(t)$ remain in quadrature to result in a complete signal loss during such periods.

While particular embodiments of the invention have been illustrated, it is to be understood that the applicant does not wish to be limited thereto, since modifications will now be suggested to those skilled in the art. Applicant, therefore, contemplates by the appended claims to cover all such modifications as fall within the true spirit and scope of his invention.

What is claimed is:

1. In a radio receiver, a nonlinear processing circuit for suppressing a strong interfering signal in favor of a desired signal which comprises, means for deriving from a composite received signal consisting of the sum of said desired signal and said stronger interfering signal a control signal which represents the instantaneous projection of said desired signal vector on said interfering signal vector and is a function of the phase difference between said interfering signal and said desired signal, and means for multiplying said control signal and said composite received signal to produce said desired signal with said interfering signal substantially suppressed.

2. A nonlinear processing circuit in accordance with claim 1 wherein said means for deriving a control signal from said composite received signal comprises an envelope detector, means for applying said composite received signal to the input of said envelope detector, and circuit means including a resistive component having a value $R$ and a capacitive component having a value $C$ for processing the output signal Env

[$r(t)$] produced by said envelope detector, said circuit means having a transfer function expressible as $$\left(\frac{sRC}{1+sRC}\right) L\{Env[r(t)]\}.$$

3. A nonlinear processing circuit in accordance with claim 1 wherein said circuit means for processing the output of said envelope detector comprises an averager having an input coupled to the output of said envelope detector, and a difference amplifier having a first input coupled to the output of said envelope detector and a second input coupled to the output of said averager, said control signal being available at the output of said difference amplifier.

4. In a radio receiver, a nonlinear processor comprising, in combination, an envelope detector, circuit means including a resistive component having a value $R$ and a capacitive component having a value $C$ for processing the output signal Env [$r(t)$] of said envelope detector, said circuit means having a transfer function expressible as $$\left(\frac{sRC}{1+sRC}\right) L\{Env[r(t)]\}$$

multiplier having first and second inputs and an output, means coupling the output of said circuit means to the first input of said multiplier, and means for applying said received signal to the second input of said multiplier, the output of said multiplier being the output of said nonlinear processor.

5. A nonlinear processor in accordance with claim 4 wherein said circuit means for processing the output of said envelope detector comprises an averager having an input coupled to the output of said envelope detector, and a difference amplifier having a first input coupled to the output of said envelope detector and a second input coupled to the output of said averager, the output of said difference amplifier being the output of said circuit means.

6. A nonlinear processor in accordance with claim 4 wherein said means coupling the output of said circuit means to the first input of said multiplier includes a limiter for quantizing the signal produced at the output of said circuit means into a binary signal.

7. A nonlinear processor in accordance with claim 4 wherein said received signal includes a desired spread spectrum signal, and said receiver further includes a correlator for recovering narrow band information from said spread spectrum signal, the input of said correlator being coupled to the output of said multiplier.

8. A nonlinear processor in accordance with claim 7 wherein said spread spectrum signal is quaternary phased.

9. In a radio communication system including a transmitter and receiver, means for suppressing a strong interfering signal in said receiver in favor of the desired signal transmitted by said transmitter which comprises, modulation means in said transmitter for producing a spread spectrum signal, a correlator in said receiver for recovering narrow band information from said spread spectrum signal, and a nonlinear processing circuit connected ahead of said correlator in said receiver and comprising means for deriving from a composite received signal consisting of the sum of said desired spread spectrum signal and said stronger interfering signal a control signal which represents the instantaneous projection of said desired spread spectrum signal vector on said interfering signal vector, and means for multiplying said control signal and said composite received signal to produce said desired spread spectrum signal with said interfering signal substantially suppressed, the output of said multiplying means being coupled to the input of said correlator.

10. A communication system according to claim 9 wherein said means for deriving a control signal from said composite received signal comprises an envelope detector, means for applying said composite received signal to the input of said envelope detector, and circuit means including a resistive component having a value $R$ and a capacitive component having a value $C$ for processing the output signal Env [$r(t)$] produced by said envelope detector, said circuit means having a transfer function expressible as $$\left(\frac{sRC}{1+sRC}\right) L\{Env[r(t)]\}$$

11. A communication system according to claim 10 wherein said circuit means for processing the output of said envelope detector comprises an averager having an input coupled to the output of said envelope detector, and a difference amplifier having a first input coupled to the output of said envelope detector and a second input coupled to the output of said averager, said control signal being available at the output of said difference amplifier.

12. A communication system according to claim 11 wherein said modulation means in the transmitter includes a four-phase modulator and is operative to produce a quaternary-phased spread spectrum signal.